United States Patent
Walter

(10) Patent No.: US 10,257,979 B2
(45) Date of Patent: Apr. 16, 2019

(54) HARVESTER HEADER PITCH ADJUSTMENT APPARATUS

(71) Applicant: AGCO do Brasil, Hesston, KS (US)

(72) Inventor: Airton Solimar Walter, Nova Sant Rita (BR)

(73) Assignee: AGCO DO BRASIL SA LTDA, Ribeireo Preto, Sau Paulo (BR)

( * ) Notice: Subject to any disclaimer, the term of this patent is extended or adjusted under 35 U.S.C. 154(b) by 43 days.

(21) Appl. No.: 15/483,040

(22) Filed: Apr. 10, 2017

(65) Prior Publication Data

US 2017/0311545 A1 Nov. 2, 2017

(30) Foreign Application Priority Data

Apr. 29, 2016 (GB) .................................. 1607568.1

(51) Int. Cl.
| | | |
|---|---|---|
| A01D 41/14 | (2006.01) | |
| A01B 63/108 | (2006.01) | |
| A01D 61/00 | (2006.01) | |
| A01D 41/16 | (2006.01) | |

(52) U.S. Cl.
CPC .......... *A01D 41/145* (2013.01); *A01B 63/108* (2013.01); *A01D 41/141* (2013.01); *A01D 41/16* (2013.01); *A01D 61/008* (2013.01)

(58) Field of Classification Search
CPC .. A01D 41/141; A01D 41/145; A01D 75/287; A01D 41/16; A01D 41/14; A01D 34/008; A01D 41/06; A01D 75/28; A01B 63/004
See application file for complete search history.

(56) References Cited

U.S. PATENT DOCUMENTS

| | | | | |
|---|---|---|---|---|
| 4,776,153 A | * | 10/1988 | DePauw | A01D 41/145 56/10.2 E |
| 5,381,645 A | * | 1/1995 | Schumacher | A01D 75/287 56/10.2 E |
| 5,464,371 A | * | 11/1995 | Honey | A01D 41/14 460/20 |
| 5,918,448 A | * | 7/1999 | Wheeler | A01D 75/287 56/10.2 E |
| 6,510,680 B2 | * | 1/2003 | Uhlending | A01D 75/287 56/10.2 E |
| 7,191,582 B2 | * | 3/2007 | Bomleny | A01D 41/141 56/10.2 E |

(Continued)

FOREIGN PATENT DOCUMENTS

| | | |
|---|---|---|
| DE | 4223026 A | 1/1994 |
| DE | 102004058116 A1 | 6/2006 |

OTHER PUBLICATIONS

UK Intellectual Property Office, International Search Report for priority application No. GB1607568.1, dated Oct. 27, 2016.

*Primary Examiner* — Arpad Fabian-Kovacs

(57) ABSTRACT

An agricultural harvester comprises a feederhouse pivotally attached to a chassis, where the feederhouse defines a conduit for conveying crop material rearwardly from a front opening. A header interface frame is pivotally mounted to the feederhouse over the front opening to permit header pitch adjustment around a pitch adjustment axis. Upper and lower linear actuators are connected on one side of the feederhouse between the feederhouse and interface frame to control the pitch adjustment.

9 Claims, 3 Drawing Sheets

(56) References Cited

U.S. PATENT DOCUMENTS

| | | | | |
|---|---|---|---|---|
| 7,207,164 | B2 * | 4/2007 | Bomleny | A01D 41/141 56/10.2 E |
| 7,222,475 | B2 * | 5/2007 | Bomleny | A01D 41/141 56/10.2 E |
| 7,430,846 | B2 * | 10/2008 | Bomleny | A01D 41/141 56/10.2 E |
| 7,661,251 | B1 | 2/2010 | Sloan et al. | |
| 7,707,811 | B1 * | 5/2010 | Strosser | A01D 41/141 56/10.2 E |
| 8,245,489 | B2 * | 8/2012 | Talbot | A01D 41/141 56/10.2 E |
| 9,148,998 | B2 * | 10/2015 | Bollin | A01D 41/141 |
| 9,309,057 | B2 * | 4/2016 | Juelke | A01D 41/16 |
| 9,717,181 | B2 * | 8/2017 | Boyd, III | A01D 41/16 |
| 9,730,375 | B2 * | 8/2017 | De Coninck | A01B 63/008 |
| 9,775,291 | B2 * | 10/2017 | Neudorf | A01D 41/145 |
| 9,844,184 | B2 * | 12/2017 | Johnson | A01D 75/287 |
| 9,867,324 | B2 * | 1/2018 | De Coninck | A01B 63/004 |
| 9,968,034 | B2 * | 5/2018 | De Lathauwer | A01D 67/005 |
| 2004/0006958 | A1 * | 1/2004 | Thiemann | A01D 41/141 56/10.2 R |
| 2004/0040276 | A1 * | 3/2004 | Allworden | A01D 41/141 56/10.2 R |
| 2007/0214760 | A1 | 9/2007 | Bomleny et al. | |
| 2010/0043368 | A1 * | 2/2010 | Sloan | A01D 41/141 56/10.2 E |
| 2010/0071330 | A1 * | 3/2010 | Coers | A01D 41/14 56/10.6 |
| 2014/0215992 | A1 * | 8/2014 | Schraeder | A01D 41/145 56/14.7 |
| 2015/0033692 | A1 * | 2/2015 | Schroeder | A01D 34/008 56/10.2 E |
| 2015/0230403 | A1 * | 8/2015 | Jung | A01D 41/127 701/50 |
| 2015/0271999 | A1 * | 10/2015 | Enns | G05B 15/02 700/275 |
| 2015/0305239 | A1 * | 10/2015 | Jung | A01D 41/141 701/50 |
| 2016/0150716 | A1 | 6/2016 | DeConinck | |
| 2016/0278276 | A1 * | 9/2016 | De Coninck | A01B 63/004 |
| 2017/0013778 | A1 * | 1/2017 | Borry | A01D 41/145 |

* cited by examiner

HARVESTER HEADER PITCH ADJUSTMENT APPARATUS

CROSS-REFERENCE TO RELATED APPLICATION

The present application claims the benefit of and priority from United Kingdom patent application No. GB1607568.1, filed Apr. 29, 2016, the entire disclosure of which is hereby incorporated by reference.

BACKGROUND

Field of the Invention

The invention relates to self-propelled crop harvesting machines which include a header supported on the front end thereof, and particularly to a header attachment assembly that facilitates header pitch adjustment.

Description of Related Art

Self-propelled harvesters are well known and include, by way of example, combine harvesters, windrowers and forage harvesters, all of which typically include a frame or chassis, a drivers cab, an engine and ground engaging wheels or tracks. A cutting or pick-up header is often carried by the harvester, the header typically being considerably wider than the harvester and mounted to the front side of a feederhouse.

Crop material collected by the header is conveyed into the feederhouse before being conveyed in a generally rearward direction to crop processing apparatus. In the case of a combine harvester, the processing apparatus serves to thresh the crop material and separate grain therefrom, whereas, in the case of a forage harvester or windrower the crop material is passed through conditioning rollers for example.

The height of the header is typically adjusted by raising and lowering of the feederhouse around a lateral feeder house pivot axis. To permit pitch adjustment of the header with respect to the feederhouse a header interface frame is often pivotally mounted to the feederhouse over the front opening thereof to permit pitch adjustment around a lateral pitch adjustment axis. A hydraulic cylinder isare provided to control adjustment of the lateral tilt.

US-2014/0041352 discloses a combine harvester having a header interface frame which allows for adjustment of the header pitch.

As headers get wider and heavier larger hydraulic cylinders are required to control the lateral pitch. This places strain on the fixings and weldments adding to the cost and complexity of the feederhouse structure.

BRIEF SUMMARY OF THE INVENTION

According to the invention there is provided a header attachment assembly for an agricultural harvester comprising a feederhouse pivotally attached to a chassis, the feederhouse defining a conduit for conveying crop material rearwardly from a front opening, a header interface frame pivotally mounted to the feederhouse over the front opening to permit header pitch adjustment around a pitch adjustment axis, an upper linear actuator and a lower linear actuator both connected on one side between the feederhouse and interface frame to control the pitch adjustment.

By providing upper and lower linear actuators the stresses placed on the feederhouse weldments are substantially reduced allowing for a simpler construction whilst still meeting the demands of wider headers.

The upper and lower linear actuators are preferably coupled to the interface frame above and below the pitch adjustment axis respectively. In this case, the hydraulic cylinders are controlled so that whilst the upper linear actuator is extended the lower actuator is retracted.

The linear actuators may be hydraulic cylinders or electric actuators.

With suitable hydraulic connections, such as flow divider valves, the upper hydraulic cylinder may be of a different size to that of the lower hydraulic cylinder. Advantageously, the size of the cylinders can then be selected so as to fit around other components such as the header driveline.

The hydraulic cylinders may be either single acting or double acting. When the hydraulic cylinders are single acting the weight of the header may be exploited to adjust the pitch in one direction, typically downward pivoting of the header.

The header attachment assembly may be embodied in a header pitch control system which also includes a hydraulic controller and hydraulic supply lines which serve to control extension and retraction of the hydraulic cylinders in response to a tilt adjustment command. The retract port of one cylinder may be in fluid communication with an extend port of the other hydraulic cylinder on that given side so as to couple the hydraulic control of the cylinders together ensuring simultaneous actuation.

Aspects of the invention are applicable to all self-propelled harvesters having a header frame with lateral pitch adjustment including combine harvesters, forage harvesters and self-propelled windrowers.

BRIEF DESCRIPTION OF THE DRAWINGS

The above-mentioned features of the invention will be better understood from the following description of an embodiment of the invention with reference to the appended drawings in which.

DETAILED DESCRIPTION OF A SPECIFIC EMBODIMENT

Figure 1:
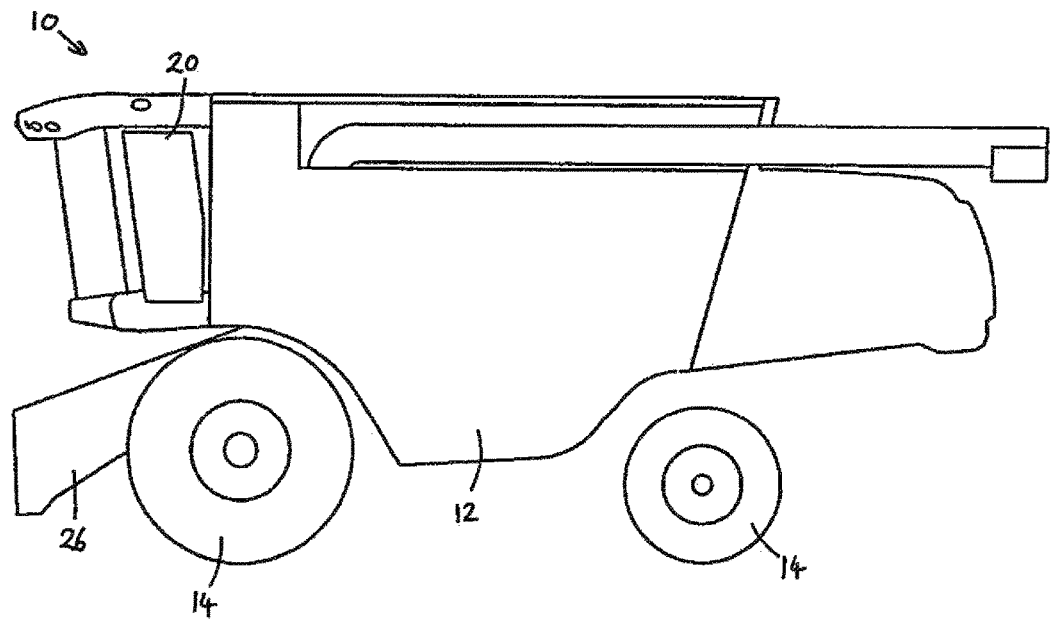
FIG. 1 is a schematic side view of a combine harvester.

FIG. 1 shows an agricultural machine in the form of a combine harvester 10, hereinafter referred to as 'combine', operable to cut and thresh crop material in the field. Although the invention will be described with reference to a combine, one skilled in the art shall appreciate that other agricultural machines, such as forage harvesters and windrowers may also utilise the invention disclosed herein.

The combine 10 includes a chassis or frame 12 supported by wheels 14 for movement across a field to be harvested. The frame 12 carries a cab 20 within which an operator controls operation of the combine 10. A header (not shown) is supported on the feederhouse 26 at the front of the combine 10 in a manner understood by those skilled in the art.

The feederhouse 26 is provided with a front mouth or opening 28 for receiving a stream of crop material from an attached header. An elevator, typically a chain and slat elevator, is provided inside the feederhouse 26 for conveying the crop stream upwardly and rearwardly to a threshing mechanism (not shown) within the combine 10. The crop material is processed inside the body of the combine in a known manner.

Figure 2:
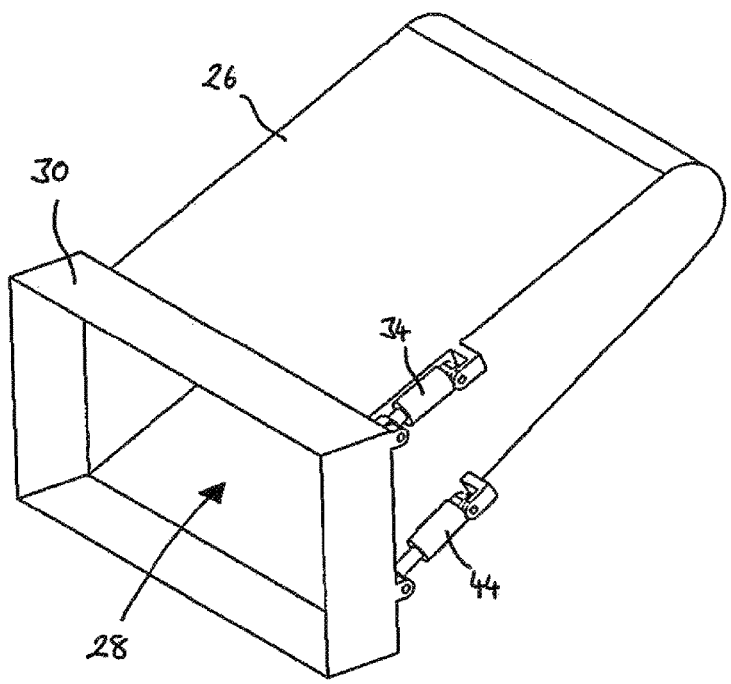
FIG. 2 is a front perspective view of header attachment assembly in accordance with an embodiment of the invention.
Figure 3:
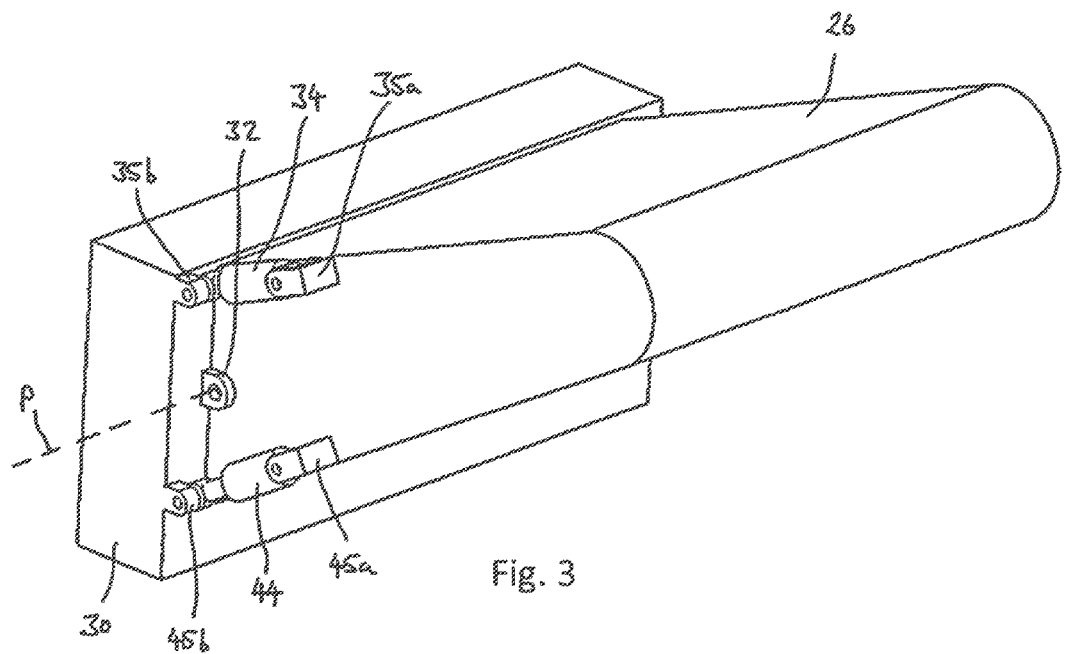
FIG. 3 is a rear perspective view of the header attachment assembly of FIG. 2.
Figure 4:
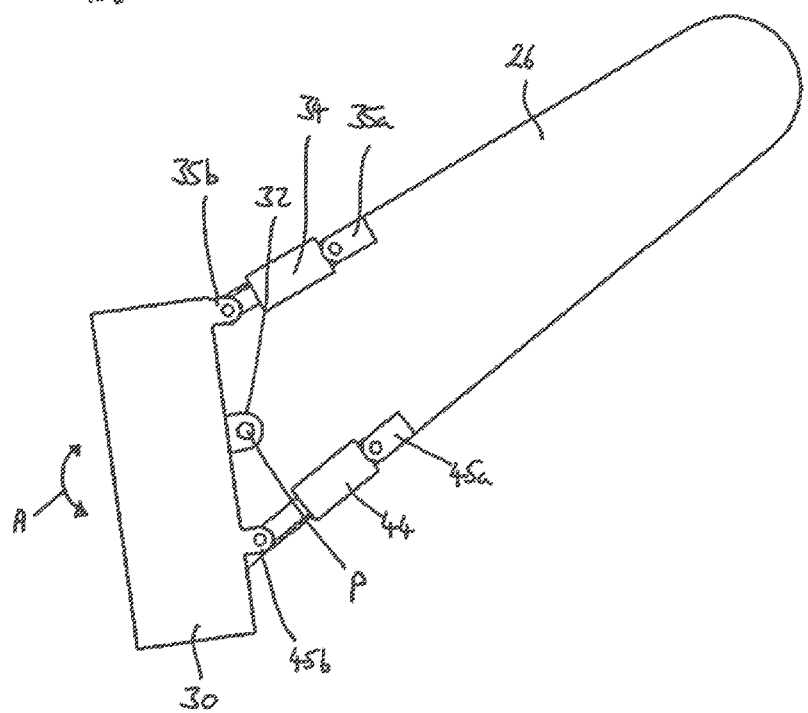
FIG. 4 is side view of the header attachment assembly of FIG. 2.

With reference also to FIGS. 2, 3 and 4, the feederhouse 26 defines a conduit for conveying crop material rearwardly from the front opening 28. A header interface frame 30 defines a generally rectangular opening that matches and overlays the front opening 28. The interface frame 30 is pivotally mounted to the front of feederhouse 26 over the front opening 28. The interface frame 30 is mounted to the feederhouse 26 so as to be pivotable about a lateral pitch adjustment axis P defined by the location of the pins inserted through mounting brackets 32.

A header attached to the front of interface frame 30 has a pitch which can be adjusted by movement of the interface frame 30 with respect the feederhouse 26 in a movement direction indicated by arrow A in FIG. 4. Adjustment of the pitch is controlled by two pairs of hydraulic cylinders positioned on each side of the feederhouse 26. It should be appreciated that only the left-hand pair of cylinders is shown in the figures for simplicity whilst the (optional) right-hand pair is constructed and controlled in the same manner.

An upper hydraulic cylinder 34 is secured to the feederhouse 26 at one end by a bracket 35a and at other end to the interface frame 30 by a suitable bracket 35b. The upper hydraulic cylinder 34 is connected to the interface frame 30 at a point above the pitch adjustment axis P.

A lower hydraulic cylinder 44 is similarly connected between the feederhouse 26 and the interface frame 30. A first end of the lower hydraulic cylinder 44 is mounted to the side of the feeder house 26 by a bracket 45a and at the other end to the interface frame 30 by a suitable bracket 45b. The lower hydraulic cylinder 44 is connected to the interface frame 30 at a position below the pitch adjustment axis P.

It should be understood that in order to pitch the header downwardly the upper hydraulic cylinder 34 is extended whilst the lower hydraulic cylinder 44 is retracted. Conversely, in order to pitch the header upwardly the upper hydraulic cylinder 34 is retracted whilst the lower hydraulic cylinder 44 is extended.

The hydraulic cylinders 34,44 may be either single acting or dual acting. In the case of single acting cylinders the weight of an attached header may be exploited to adjust the header pitch.

Although described as hydraulic cylinders, it is envisaged that electric actuators may instead be employed without deviating from the scope of the invention.

Figure 5:
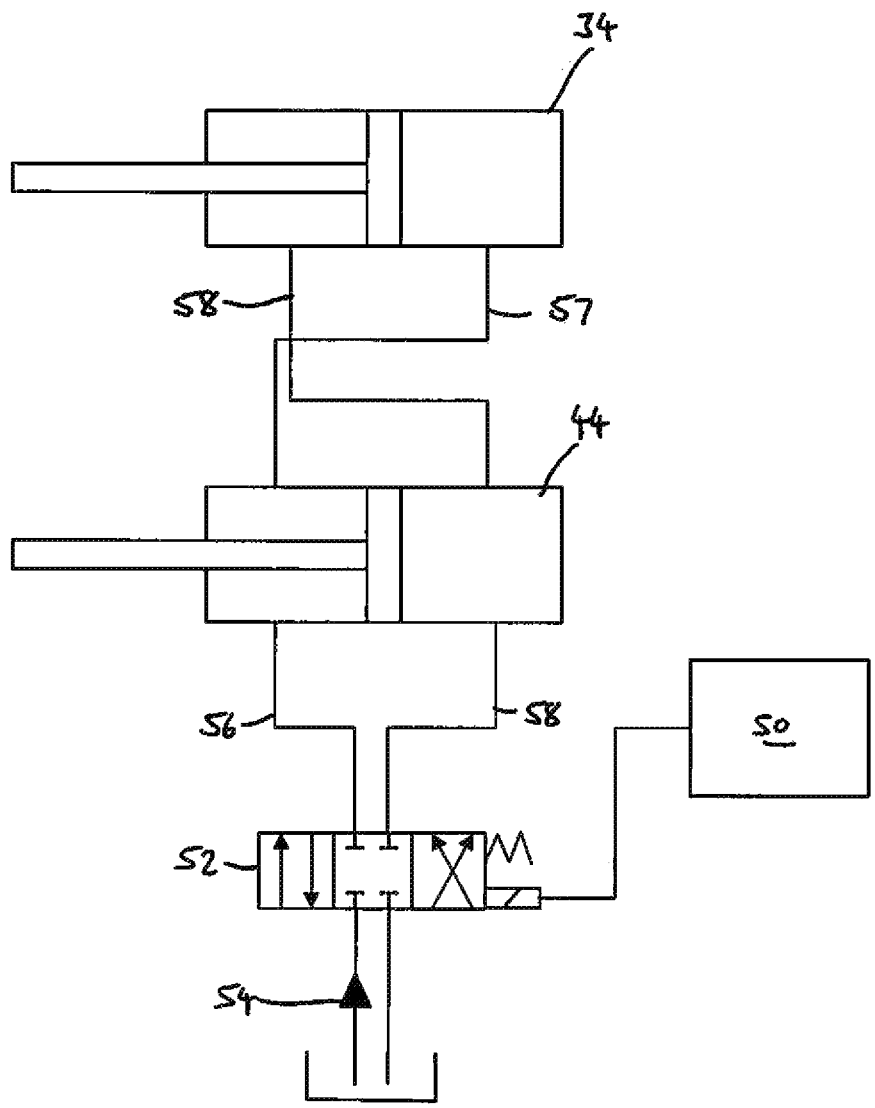
FIG. 5 is a schematic diagram of a header pitch control system for the header attachment assembly of FIG. 2.

The upper and lower hydraulic cylinders 34,44 are controlled by a hydraulic controller 50 and suitable hydraulic control components as will be known to those skilled in the art. FIG. 5 shows an example hydraulic control system in which a proportional control valve 52 is controlled by the hydraulic controller 50 in response to received tilt adjustment commands. The valve 52 serves to collectively connect the ports of the hydraulic cylinders 34,44 to a supply of pressurised fluid 54.

In response to a command to adjust the header pitch downwardly hydraulic line 56 connected to the retract port of the lower cylinder 44 is pressurised by movement of valve 52 to the right. The retract port of lower hydraulic cylinder 44 is also fluidly connected to the extend port of the upper cylinder 34 by hydraulic line 57. As such the upper cylinder 34 extends at the same time as the lower cylinder 44 retracts thus pivoting the interface frame 30 and attached header downwardly.

In response to a command to adjust the pitch upwardly hydraulic line 58 connected to the extend port of lower cylinder 44 is pressurised by movement of valve 52 to the left. The extend port of lower cylinder 44 is hydraulically connected to the retract port of upper cylinder 34 by hydraulic line 59. As such the upper cylinder 34 is caused to retract at the same time as the lower cylinder 44 extends thus pivoting the interface frame 30 and attached header upwardly.

From reading the present disclosure, other modification will be apparent to persons skilled in the art. Such modifications may involve other features which are already known in the field of harvester headers and which may be used instead of or in addition to features already described herein.

The invention claimed is:

1. A header attachment assembly for an agricultural harvester comprising a feederhouse pivotally attached to a chassis, the feederhouse defining a conduit for conveying crop material rearwardly from a front opening, a header interface frame pivotally mounted to the feederhouse over the front opening to permit header pitch adjustment around a pitch adjustment axis, a first linear actuator and a second linear actuator both connected on one side between the feederhouse and interface frame to control the pitch adjustment, wherein the first linear actuator is an upper linear actuator coupled to the interface frame above the pitch adjustment axis, and wherein the second linear actuator is a lower linear actuator coupled to the interface frame below the pitch adjustment axis.

2. A header attachment assembly according to claim 1, wherein the linear actuators are hydraulic cylinders.

3. A header attachment assembly according to claim 2, wherein the upper hydraulic cylinder is smaller than the lower hydraulic cylinder.

4. A header attachment assembly according to claim 2, wherein the upper hydraulic cylinder is single-acting and extends under the force of the header weight.

5. A header attachment assembly according to claim 2, wherein the lower hydraulic cylinder is single-acting and retracts under the force of the header weight.

6. A header attachment assembly according to claim 2, wherein both the upper and lower hydraulic cylinders are double-acting.

7. A header pitch control system comprising a header attachment assembly according to claim 2, and a hydraulic controller configured with hydraulic supply lines and the hydraulic cylinders to control extension and retraction of the hydraulic cylinders in response to a tilt adjustment command.

8. A header pitch control system according to claim 7, wherein the upper hydraulic cylinder has a retract port which is in fluid communication with an extend port of the lower hydraulic cylinder.

9. A self-propelled harvester comprising a header pitch control system according to claim 7.

* * * * *